United States Patent [19]

Prusak

[11] 4,316,281

[45] Feb. 16, 1982

[54] SPACER FOR STACKED RECORDED DISCS

[75] Inventor: John J. Prusak, Indianapolis, Ind.

[73] Assignee: RCA Corporation, New York, N.Y.

[21] Appl. No.: 189,349

[22] Filed: Sep. 22, 1980

[51] Int. Cl.³ .................. G11B 3/62; B65D 85/02; B65D 85/57; B65D 81/02

[52] U.S. Cl. ..................... 369/291; 206/309; 206/516; 206/521; 369/212

[58] Field of Search ............. 206/521, 516, 309, 307, 206/303, 444, 311, 445; 369/291, 289, 290, 212

[56] References Cited

U.S. PATENT DOCUMENTS

| | | | |
|---|---|---|---|
| 1,683,440 | 9/1928 | Bodwell et al. | 369/291 |
| 1,908,940 | 5/1933 | Weidel | 206/516 |
| 2,906,536 | 9/1959 | Mauerhoff | 369/291 |
| 3,051,496 | 8/1962 | Borgia | 369/290 |
| 3,169,023 | 2/1965 | Rivas | 369/291 |
| 3,360,271 | 12/1967 | George | 369/291 |
| 3,670,878 | 6/1972 | Seiger | 206/444 |
| 3,854,729 | 12/1974 | Downs | 369/291 |
| 4,021,048 | 5/1977 | Fowler et al. | 369/289 |

*Primary Examiner*—William T. Dixson, Jr.
*Attorney, Agent, or Firm*—Birgit E. Morris; Donald S. Cohen

[57] ABSTRACT

A spacer for use between two adjacent recorded discs in a stack of the discs includes a flat, circular, relatively rigid plate having opposed major surfaces and a hole through the center thereof. The plate has portions around its peripheral edge and the edge of the hole which are thicker than the rest of the plate and project beyond the major surfaces of the plate. The thicker portions of the spacer engage unrecorded surface portions of the adjacent recorded discs so as to space the recorded portions of the adjacent recorded discs from the major surfaces of the spacer plate to prevent dust, dirt and other contaminating particles from being pressed into or against the recorded portions of the recorded discs which may damage the recorded discs.

10 Claims, 3 Drawing Figures

SPACER FOR STACKED RECORDED DISCS

BACKGROUND OF THE INVENTION

The present invention relates to a spacer for use between recorded discs which are arranged in a stack, and particularly to a spacer which prevents any dust, dirt or other contaminating particles from scratching or otherwise damaging the disc playing area.

Recorded discs generally comprise a circular, flat plate or disc of a plastic material having a center hole therethrough and recorded information provided thereon in the form of a surface relief pattern formed along a spiral path in the major surfaces of the disc. The surface relief patterns preferably are formed in a spiral groove in the surfaces of the disc. The center portion and an outer edge portion of the major surfaces is generally left blank. Recently, there has been developed a high density recorded disc, such as a video disc, in which there are a large number of grooves per inch of the diameter of the disc, e.g. 10,000 grooves per inch (4000 grooves per cm). Because of the large numbers of these grooves, they are very narrow and shallow, i.e. 27 microns in width and 4000 Angstroms in depth. Because of the fineness of these grooves, any scratches in the surface of the disc can severely disrupt the operation of the disc and their presence is therefore highly undesirable.

The recorded discs are generally made in a mold press which includes a mold in which the discs are formed and a mechanism for removing flash from around the outer edge of the molded disc. From the flash removing mechanism the disc is transferred to a rack which is a base plate having a cylindrical rod projecting upwardly therefrom. The discs are stacked on the rack with the rod extending through the center holes in the disc. In order to prevent distortion and warping of the discs as they cool, a thin metal spacer plate is periodically placed between the discs, such as every fifth to tenth disc, so as to provide a more uniform distribution of the weight of the disc on the discs below. However, if any dust, dirt or other type of contaminating particles fall on the disc just beneath the spacer plate or on the surface of the spacer plate in the playing area, the spacer will press the particles into the surfaces of the adjacent discs, causing dents, scratches and the like in the playing surfaces of the discs. In view of the very small size of the grooves in the disc, such dents and scratches can disrupt the information on a large number of the grooves which will adversely effect the playing of the disc.

SUMMARY OF THE INVENTION

A spacer for use between two adjacent recorded discs in a stack of the discs is a flat, circular, relatively rigid plate having a hole through the center thereof and portions around its peripheral edge and the edge of the hole which are thicker than the rest of the plate. The thicker portions are of substantially uniform thickness. The thicker portions of the spacer plate space the surfaces of the thinner portion from the surfaces of the adjacent recorded disc so that any contaminating particles which may be on the surfaces of the disc or the spacer plate are not pressed into or scratched against the surfaces of the recorded disc playing area, thereby protecting the playing area.

DETAILED DESCRIPTION OF A PREFERRED EMBODIMENT

Figure 1:
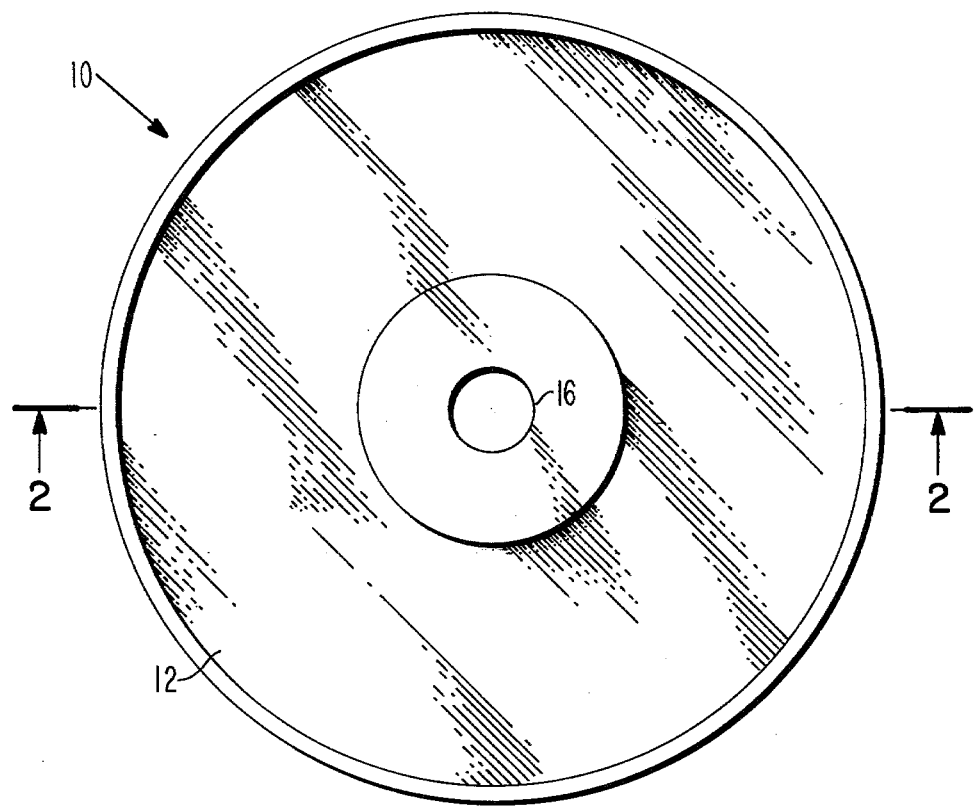
FIG. 1 is a top plan view of a form of the spacer of the present invention.
Figure 2:
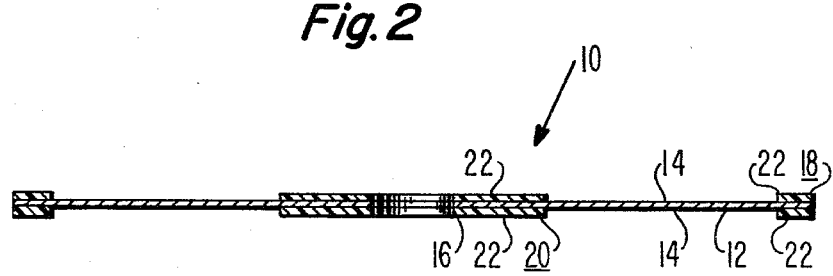
FIG. 2 is a sectional view taken along line 2—2 of FIG. 1.

Referring to FIGS. 1 and 2, a preferred embodiment of the present invention is generally designated as 10. The spacer 10 is a thin, flat, circular, relatively rigid plate 12, having opposed major surfaces 14 and a center hole 16 therethrough. The plate 12 is preferably made of a metal, such as aluminum, although it can be made of other relatively rigid materials, such as a plastic. The plate 12 has a diameter of about 12" (30.5 cm), and a thickness of about 0.04" (0.1 cm). The center hole 16 has a diameter of about 3" (7.6 cm). The spacer 10 has thicker portions 18 and 20 around its outer periphery and the edge of the center hole 16 respectively. The thicker portions 18 and 20 project beyond the major surfaces 14 of the plate 12. As shown, the thicker portions 18 and 20 are formed by thin strips of a plastic material, such as nylon, teflon or high impact polyethylene, bonded to the major surfaces 14 of the plate 12. The plastic strips 22 are of a thickness of about 0.035" (0.09 cm) so that the total thickness of each of the thicker portions 18 and 20 are about 0.11" (0.28 cm). The plastic strips 22 are bonded to the plate 12 with a suitable adhesive. However, if the plate 12 is of a plastic material, the thicker portions 18 and 20 may be integral portions of the plate. The thicker portion 18 at the periphery of the spacer 10 is very narrow, about 0.3" (0.76 cm) whereas the thicker portion 20 adjacent the center hole 16 is wider, about 2.7" (6.9 cm). The thicker portion 18 at the periphery of the spacer 10 is of a width corresponding to the unrecorded portion of the recorded disc at the outer edge of the disc whereas the width of the thicker portion 20 adjacent the center hole 16 corresponds to the width of the unrecorded portion of the recorded disc at the center of the disc.

Figure 3:
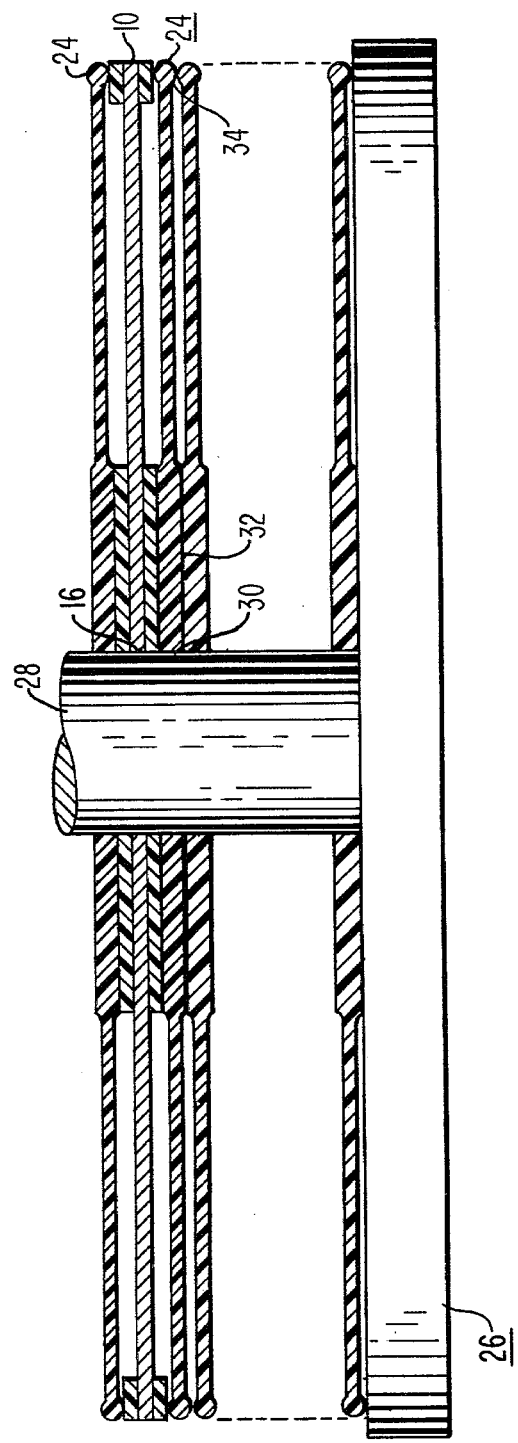
FIG. 3 is a side view, partially in section, of a stack of recorded discs on a supporting rack with a spacer plate of the present invention between two of the recorded discs.

Referring to FIG. 3, there is shown a spacer 10 of the present invention between two recorded discs 24 which are arranged in a stack on a rack 26 with the cylindrical rod 28 of the rack 26 extending through the center holes 30 in the recorded disc and the center hole 16 in the spacer 10. Each of the recorded discs 24 has a center portion 32 around its center hole 30 which is unrecorded, and a peripheral portion 34 which is also unrecorded. The recorded information is in the major surfaces of the recorded discs 24 between the center portion 32 and the peripheral portion 34. As can be seen in FIG. 3, the thicker portions 18 and 20 of the spacer 10 engage the major surfaces of the adjacent recorded discs 24 at the unrecorded portions 34 and 32 respectively so that the recorded portions of the major surfaces of the recorded discs 24 are spaced from the major surfaces 14 of the plate 12. Thus, when the spacer 10 is placed between the record discs 24, any dust, dirt or other contaminating particles which may be on either the major surfaces of the spacer plate 12 or the recorded portions of the major surfaces of the recorded discs 24 will not be pressed into the recorded discs and the spacer plate 10 will therefore prevent scratching or other damaging of the recorded portions of the recorded discs 24.

I claim:

1. A spacer for use between two adjacent recorded discs in a stack of said discs comprising a flat circular relatively rigid plate having opposed major surfaces and a hole through the center thereof, said plate having portions around its peripheral edge and the edge of the hole which are thicker than the rest of the plate, with the thicker portions being of substantially uniform thickness.

2. A spacer in accordance with claim 1 in which each surface of the thicker portions of the plate project beyond the adjacent major surface of the plate.

3. A spacer in accordance with claim 2 in which the thicker portion around the peripheral edge has a radial width less than that of the thicker portion adjacent the center hole.

4. A spacer in accordance with claim 2 in which the plate is of a metal and the thicker portions include strips of a plastic material bonded to the major surfaces of the metal.

5. A spacer in accordance with claim 4 in which the thickness of each of the plastic strips is about equal to the thickness of the metal plate.

6. In a stack of recorded discs in which each disc has a recorded portion in at least one major surface and unrecorded portions around the periphery of the disc and the edge of a center hole in the disc and a flat, circular, substantially rigid spacer having a pair of opposed major surfaces and a center hole therethrough between two adjacent recorded discs, the improvement comprising:

said spacer having portions around its peripheral edge and the edge of the center hole which are thicker than the rest of the spacer with the thicker portions being of uniform thickness and contacting the surfaces of the adjacent recorded discs.

7. A stack of recorded discs in accordance with claim 6 in which the thicker portions of the spacer project beyond both major surfaces of the spacer.

8. A stack of recorded discs in accordance with claim 7 in which the radial width of each of the thicker portions is no greater than the radial width of the adjacent unrecorded portions of the recorded discs so that the thicker portions contact the unrecorded portions of the adjacent unrecorded discs and space the recorded portions of the recorded discs from the major surfaces of the spacer.

9. A stack of recorded discs in accordance with claim 8 in which the spacer is a plate of a metal and the thicker portions include strips of a plastic material bonded to the major surfaces of the metal plate.

10. A stack of recorded discs in accordance with claim 9 in which the thickness of each of the plastic strips is about equal to the thickness of the metal plate.

* * * * *